July 12, 1960

J. A. MILLER 2,944,747

TENSION CONTROLLER

Filed June 19, 1956

INVENTOR.
JOSEPH A. MILLER

BY Joseph E. Ryan

ATTORNEY

United States Patent Office 2,944,747
Patented July 12, 1960

2,944,747
TENSION CONTROLLER

Joseph A. Miller, Stillwater, Minn., assignor to Minneapolis-Honeywell Regulator Company, Minneapolis, Minn., a corporation of Delaware Filed June 19, 1956, Ser. No. 592,415

5 Claims. (Cl. 242—45)

The novel device disclosed is a tension sensing and control device, and more specifically, it is a tension sensing and control unit operated with a winding machine.

In general, winding machines for use in both general industry and in specialized technical manufacture require some form of tension sensing and control of the element being wound. In the past it has been common to use a sensing roller or feeler that operates through some form of mechanical linkage to operate the control mechanism. This type of sensing and control device is satisfactory as long as the speed of response is not critical and the strength of the element being wound is substantial. Under modern day design trends an almost instantaneous response of a winding machine has not only become desirable but is a necessity. Further, the element being wound may be exceedingly thin and weak. As an example, elements such as a fine wire in the neighborhood of 0.0002 inch in diameter have become necessary parts of potentiometers in highly refined equipment. It became apparent that mechanical systems were totally impractical for the modern potentiometer winders and more refined sensing and control equipment became necessary.

It is an object of this invention to provide a winding machine tension sensing and control system capable of substantially instantaneous response.

A further object is to disclose a tension sensor which requires an exceedingly small activating force.

Still a further object is to disclose a tension sensing and control system that utilizes an electrical sensing unit, such as a differential transformer.

These and other objects will become apparent when the single sheet of attached drawings are considered in connection with this specification, wherein.

Figure 1:
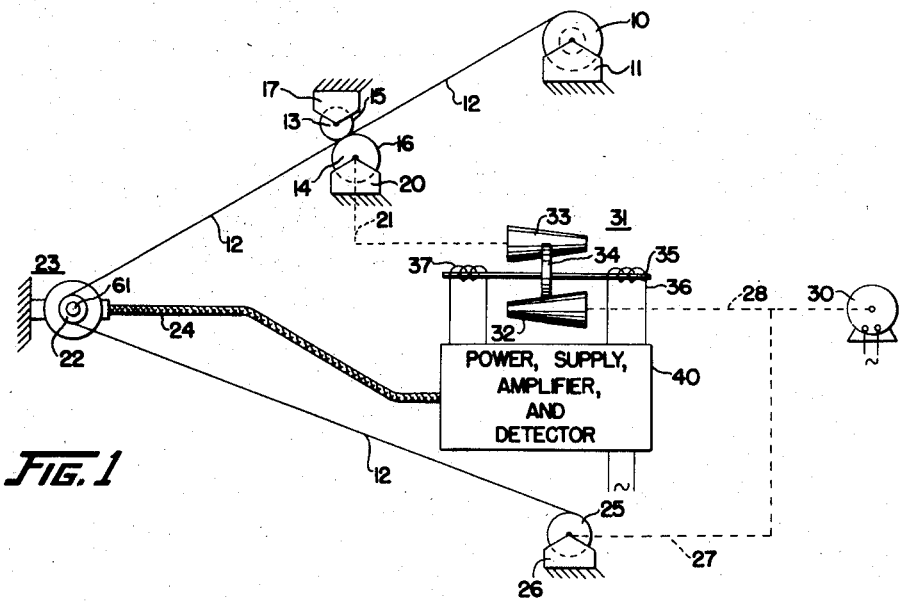
Figure 1 is a schematic representation of a winding machine incorporating the disclosed novel sensing and control system.

In Figure 1 there is generally disclosed, in schematic or block form, a winding machine which utilizes the novel principles of the tension sensing and control system. A supply spool 10 is mounted for rotation in a support 11. The support 11 normally will contain some type of frictional retarding means (not shown) to restrain the supply spool 10 from excessive fluxuations in unwinding. A filament or elongated element 12 is supplied by the spool 10. The element 12 may be a wire, fiber, yarn, or ribbon of any description. For clarity of understanding the elements 12 can best be considered as a wire, and for convenience sake will be referred to as such below.

The wire 12 passes between two control rollers 13 and 14. These control rollers respectively have outer surfaces or rims 15 and 16 which frictionally engage the wire 12. The roller 13 is mounted for free rotation in a mounting means 17. The control roller 14 is mounted in a supporting means 20 and is driven by a mechanical input 21. The mechanical input 21 will be described in more detail below. It will be noted that as the roller 14 is driven by the mechanical input 21 that the wire 12 is forced to unroll from the supply spool 10 at a rate governed by the surface speed of the rims 15 and 16.

The wire 12 is then passed over a pulley 22 of a tension sensing device generally disclosed at 23. The detailed construction of the tension sensing device 23 will be discussed subsequently in connection with Figures 2 and 3 and at the present time it is adequate to understand that the sensing device 23 has an electrical output which varies in accordance with the tension of the wire 12. The electrical inputs and outputs of the tension sensor 23 are supplied through a cable 24. After the wire 12 has passed over pulley 22 it is fed to a bobbin 25 which is mounted for rotation in a support 26. The bobbin 25 can be any type of receiving means such as a spool, mandrel, or irregular shaped body. The only requirement for the bobbin 25 is that it be capable of being supported for rotation. A bobbin 25 is then caused to rotate in support 26 by the mechanical drives 27 and 28. The mechanical drives 27 and 28 are driven by appropriate gearing and shafts from a prime mover 30, which may be a conventional motor.

The mechanical drive 28, in addition to driving the mechanical drive 27, forms the input to a speed changing unit 31. The speed changing unit 31 may be of any suitable type and is disclosed for convenience sake as two tapered cones 32 and 33. A frictional drive disc 34 connects the cones 32 and 33 and completes the mechanical drive system from the prime mover 30 to the control roller 14 by means of mechanical input 21. The frictional drive disc 34 is supported for rotation by a shaft 35 and this shaft is operated on by two solenoids 36 and 37 which are placed at opposite sides of the frictional drive disc 34. The solenoids 36 and 37 are separately energized from a combined power supply-amplifier-detector 40 (shown in block form) which is of a nature well known to those versed in the art and is shown for example in the patent to A. P. Davis 1,798,592, dated March 31, 1931. The power supply-amplifier-detector supplies power via cable 24 to the tension sensing unit 23 and receives back a differential electric signal which is amplified and then supplied to the solenoid 36 or 37. It is further understood that the nominal tension desired can be set by the proper energization of the sensing device 23 by adjusting the energization of the unit 40 (by means not shown).

Figure 2:
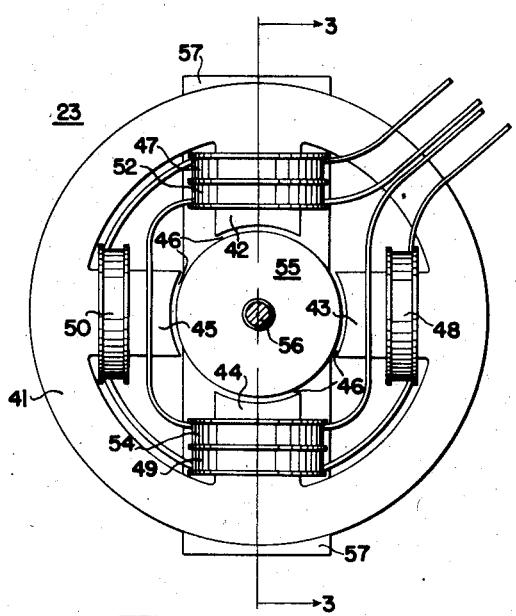
Figure 2 is an end view of a sensing unit in a simplified form.
Figure 3:
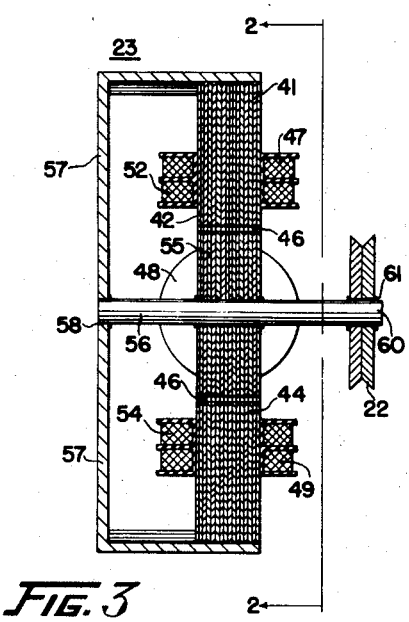
Figure 3 is a cross section of the device disclosed in Figure 2, along lines 3—3.

It becomes apparent from the above discussion that for the winding machine to be operative, a new and unusual type of tension sensing mechanism 23 must be utilized. In Figures 2 and 3 there is disclosed a simplified version of the tension sensing device 23 and the following is a description and discussion, in detail, of this unit. In the simplified form shown, the tension sensor 23 has a stator unit 41 which is formed of a plurality of laminated sheets of magnetic material. The stator 41 has four salient pole projections 42, 43, 44, and 45 which are disposed at 90 degree intervals around the interior of the stator 41. Each of the poles 42, 43, 44, and 45 have curved pole faces 46 and these pole faces all lie on the periphery of a circle whose center coincides with that of stator 41. Each pole has placed upon it a primary coil 47, 48, 49, and 50. The coils 47 through 50 are serially connected, as shown in Figure 2, to form the primary energization of the tension sensing device 23. These coils are all energized such that their instantaneous fluxes are in the same direction. The reason for this mode of energization will be discussed in more detail below. On poles 42 and 44 there are placed secondary coils 52 and 54. These coils are connected in a differential manner such that at any instant their fluxes are in opposite directions.

Disposed between the pole faces 46 is a rotor 55 which is circular in configuration. The rotor 55 is fixed to a flexible shaft 56 in any convenient manner and the rotor cooperates with the poles 42 through 45. The shaft 56 is mounted in a frame 57 at 58 forming a cantilever type of support. The frame 57 further supports the stator 41. On the free end 60 of shaft 56 is the pulley 22. The pulley 22 is mounted on a fixed bearing surface 61 so that it is freely rotatable. The element or wire 12 in passing over the pulley 22 causes a rotation of the pulley and at the same time deflects the shaft 56. The rotor element 55 does not rotate but is caused to shift in the plane of the poles 42 through 45 due to the variation of tension supplied to the wire 12.

To more easily understand the operation of the tension sensing device 23 it is assumed that the primary coils 47 through 50 are serially energized such that an instantaneous flux exists in each pole, 42 through 45, in a direction towards the rotor 55. At the same time the secondary windings 52 and 54 have fluxes which are directed opposite to the primary fluxes in the poles 42 and 44. The rotor 55 is centered with respect to the poles and the flux affecting coil 52 is equal and opposite to that affecting 54 and no output results from these differentially connected coils. If, however, the rotor 55 is moved closer to pole 42 it decreases the air gap therebetween and at the same increases the air gap between the rotor 55 and the pole 44. The flux in coil 52 then increases while the flux in coil 54 decreases and the resultant output from these windings is a reflection of the direction and amount of movement of the rotor 55. It becomes obvious that the wire 12 while passing over pulley 22 causes this movement by changes in tension in the wire 12 and that the output of the sensor 23 will therefore be a function of the tension.

If the rotor 55 moves in any direction other than to or from the poles 42 and 44 the resultant air gaps remain constant and there is no output. The selection of the energization of the primary coils 47 through 50, as made, cause all the primary fluxes to cancel out when the rotor 55 is centered and prevents saturation in the magnetic structure. This yields the most desirable results, but it is understood that there are other modes of energization of these windings which will yield a usable output from the secondary coils.

The operation of the winding machine disclosed in Figure 1 is relatively simple and comprises substantially the following sequence. The wire 12 is fed across the rim 16 of the control roller 14, over the pulley 22, to the bobbin 25. As the bobbin 25 is caused to rotate by the drive means 27 a tension is established in the wire 12. If it is assumed that the tension existing is correct the energization supplied from the sensing element 23 through cable 24 to the unit 40 will be such that the energization of the solenoids 36 and 37 is balanced and the frictional drive roller 34 remains fixed. If the tension sensed by unit 23 then increases, the unit supplies a change in differential electrical signal through cable 24 to unit 40 and the solenoid 36 is energized and moves the frictional drive disc 34 to the right. By moving the control roller 34 to the right, the speed supplied by the speed control mechanism 31 increases slightly and the control roller 14 is caused to operate at a slightly increased peripheral speed because of the mechanical drive 21. The increase in speed of roller 14 causes the rim speed of rims 15 and 16 to increase slightly and the frictional drive causes the wire 12 to increase in speed of linear travel. This increase in speed of linear travel decreases the tension in the wire 12. It will be obvious that this device operates in exactly the same manner, but in reverse, for a condition which would indicate a tension below that desired. More specifically, if the tension of wire 12 drops below that desired the sensing unit 23 supplies a signal to unit 40 which energizes the solenoid 37. Upon energizing the solenoid 37 the frictional drive disc 34 is caused to move to the left and thereby decreases the speed of control roller 14 and increases the tension on wire 12. It will be obvious that almost an immediate response is supplied by this tension control system and therefore a substantially constant tension can be supplied on wire 12 as the wire is wound on bobbin 25.

The sensitivity of the tension sensing device 23 can be varied over a wide range by the proper selection of dimensions of the unit. More specifically, the sensitivity can be readily varied by changing the size and flexibility of shaft 56 and by varying the energization of the coils 47 through 50 as well as by varying the width of the gap between the pole surfaces 46 and the rotor 55. As a practical matter wires have been wound on the above described winding machine and their tension controlled when the wire size has been but a few ten thousandth's of an inch in diameter.

It will become obvious to those skilled in the art that the novel disclosure contained above could be modified in many ways to obtain the same type and degree of results. The preferred embodiment of the arrangement has been disclosed for convenience sake but the applicant wishes to be limited in scope only by the appended claims.

I claim as my invention:

1. In a winding machine of the class described: power means having outputs one of which is fixed in speed and another is variable in speed; control means connected to said power means for varying said variable output; a supply spool mounted for rotation; drive means driven by said variable speed output of said power means; bobbin means mounted for rotation and being driven by said fixed speed output of said power means; a tension sensing device having a stator and a core and including energizing and output windings; means resiliently mounting said core including a guide means in cooperation with said stator; an elongated element to be wound from said supply spool to said bobbin and passing through said drive means and over said guide means; and circuit means connecting said output windings of said tension sensing device to said control means to control the energization of the same, the tension of said elongated element deflecting the core to variably energize the output windings of said tension sensing device from said energizing windings to vary the energization of said control means to vary said variable output and operate said drive means to maintain constant tension on said elongated element.

2. In a winding machine of the class described: power means having outputs one of which is fixed in speed and another is variable in speed; control means connected to said power means for varying said variable output; a supply spool mounted for rotation; drive means driven by said variable speed output of said power means; bobbin means mounted for rotation and being driven by said fixed output of said power means; a tension sensing device having a stator and a core and including energizing and output windings; a cantilever mounted shaft resiliently mounting said core in cooperation with said stator including a journalled guide means at the extremity thereof; and circuit means connecting said output windings of said tension sensing device to said control means to control the energization of the same, the tension of said elongated element deflecting the core to variably energize the output windings of said tension sensing device from said energizing windings to vary the energization of said control means to vary said variable output and operate said drive means to maintain constant tension on said elongated element.

3. In a winding machine of the class described: power means having outputs one of which is fixed in speed and another is variable in speed; control means connected to said power means for varying said variable output; a supply spool mounted for rotation; two control rollers having abutting rims and at least one of said rollers being driven by said variable speed output of said power means; a tension sensing device having a stator and a core and including energizing and output windings; means resiliently mounting said core including a guide means in cooperation with said stator; an elongated element to be wound from said supply spool to said bobbin and passing between said rims and over said guide means; and circuit means connecting said output windings of said tension sensing device to said control means to control the energization of the same, the tension of said elongated element deflecting said core to differentially energize the output windings from said energizing windings of said tension sensing device to differentially vary the energization of said control means and operate said drive means to maintain a constant tension on said elongated element.

4. In a winding machine of the class described: power means having two rotational outputs one of which is fixed in speed and the other is variable in speed; control means connected to said power means for varying said variable output; a supply spool mounted for rotation; two control rollers having abutting rims and at least one of said rollers being driven by said variable speed output of said power means; a tension sensing device having a stator and a core and including energizing and output windings; a cantilever shaft means resiliently mounting said core in cooperation with said stator and including a guide means journalled at the extremity thereof; a filament to be wound from said supply spool to said bobbin and passing between said rims and over said guide means; and circuit means connecting said output windings of said tension sensing device to said control means to control the energization of the same, the tension of said filament deflecting said core to differentially energize the output windings from said energizing windings of said tension sensing device to differentially vary the energization of said control means and operate said drive means to maintain a constant tension on said filament.

5. In a winding machine of the class described: power means having two rotational outputs one of which is fixed in speed and the other is variable in speed; control means connected to said power means for varying said variable output; a supply spool mounted for rotation; an adjustable retarding means driven by said variable speed output of said power means; a tension sensing device having a stator and a core and including energizing and output windings; a cantilever shaft means resiliently mounting said core in cooperation with said stator and including a guide means journalled at the extremity thereof; a filament to be wound from said supply spool to said bobbin and passing through said adjustable retarding means and over said guide means; and circuit means connecting said output windings of said tension sensing device to said control means to control the energization of the same, the tension of said filament deflecting said core to differentially energize the output windings of said tension sensing device to differentially vary the energization of said control means and operate said adjustable retarding means to maintain a constant tension on said filament.

References Cited in the file of this patent

UNITED STATES PATENTS

| | | |
|---|---|---|
| 1,988,458 | Minorsky | Jan. 22, 1935 |
| 2,328,322 | Berthold | Aug. 31, 1943 |
| 2,338,605 | Tuttle et al. | Jan. 4, 1944 |
| 2,659,065 | Cordell | Nov. 10, 1953 |

FOREIGN PATENTS

| | | |
|---|---|---|
| 280,490 | Germany | Nov. 14, 1914 |